(12) United States Patent
Amend

(10) Patent No.: US 10,517,315 B2
(45) Date of Patent: Dec. 31, 2019

(54) APPLICATOR FOR APPLYING LIQUID COATINGS

(71) Applicant: NESTEC S.A., Vevey (CH)

(72) Inventor: Thomas Aloisius Valentinus Amend, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 172 days.

(21) Appl. No.: 15/531,191

(22) PCT Filed: Nov. 9, 2015

(86) PCT No.: PCT/EP2015/076057
§ 371 (c)(1),
(2) Date: May 26, 2017

(87) PCT Pub. No.: WO2016/083110
PCT Pub. Date: Jun. 2, 2016

(65) Prior Publication Data
US 2017/0332656 A1    Nov. 23, 2017

Related U.S. Application Data

(60) Provisional application No. 62/085,452, filed on Nov. 28, 2014.

(51) Int. Cl.
*A23G 1/00* (2006.01)
*A23G 1/54* (2006.01)
(Continued)

(52) U.S. Cl.
CPC ............... *A23G 1/005* (2013.01); *A23G 1/54* (2013.01); *A23G 3/0065* (2013.01);
(Continued)

(58) Field of Classification Search
None
See application file for complete search history.

(56) References Cited

U.S. PATENT DOCUMENTS 1,667,291 A * 4/1928 Lavett ..................... B01D 1/18
159/11.1
2,754,226 A     7/1956 Juvinall
(Continued)

FOREIGN PATENT DOCUMENTS

WO     0013524     3/2000
WO     02082918    10/2002

*Primary Examiner* — Charles Capozzi
(74) *Attorney, Agent, or Firm* — K&L Gates LLP

(57) ABSTRACT

The present invention relates to an apparatus for applying stripes of liquid coating on a confectionery product comprising a rotatable applicator for liquid coating, at least one shield positioned above the rotatable applicator to collect coating material not applied onto the product, a manifold for providing the rotatable applicator with the coating material in a liquid form, and wherein the rotatable applicator is arranged to spin about an axis which is orientated from horizontal and up to 30 deg of deviation from horizontal, and wherein the applicator has openings along it's circumference through which coating material may be projected upon spinning of the applicator. The invention also relates to a method for decorating confectionery products and to the products.

10 Claims, 6 Drawing Sheets

(51) Int. Cl.
*A23G 3/34* (2006.01)
*A23G 3/20* (2006.01)
*A23G 3/28* (2006.01)
*A23G 3/54* (2006.01)
*A23G 9/24* (2006.01)
*A23G 9/28* (2006.01)
*A23G 9/48* (2006.01)
*A23G 9/50* (2006.01)

(52) U.S. Cl.
CPC ......... *A23G 3/0089* (2013.01); *A23G 3/2092* (2013.01); *A23G 3/28* (2013.01); *A23G 3/54* (2013.01); *A23G 9/24* (2013.01); *A23G 9/245* (2013.01); *A23G 9/288* (2013.01); *A23G 9/48* (2013.01); *A23G 9/50* (2013.01); *A23G 9/506* (2013.01)

(56) References Cited

U.S. PATENT DOCUMENTS

| | | | |
|---|---|---|---|
| 3,346,192 A | 10/1967 | Hege | |
| 4,369,200 A * | 1/1983 | Iwao | A23G 3/2023 426/103 |
| 6,251,455 B1 | 6/2001 | Thomas | |
| 2007/0158477 A1 * | 7/2007 | Wu | B05B 1/02 239/589 |
| 2014/0203106 A1 * | 7/2014 | Hung | B05B 1/16 239/222 |

* cited by examiner

APPLICATOR FOR APPLYING LIQUID COATINGS

CROSS REFERENCE TO RELATED APPLICATIONS

The present application is a National Stage of International Application No. PCT/EP2015/076057, filed on Nov. 9, 2015, which claims priority to U.S. Provisional Patent Application Serial No. 62/085,452, filed on Nov. 28, 2014, the entire contents of which are being incorporated herein by reference.

FIELD OF THE INVENTION

The present invention relates to an apparatus and a process for apply edible decorative elements onto products such as frozen confection. In particular the invention relates to applying decorative lines onto frozen confection being in a substantially vertical position.

BACKGROUND OF THE INVENTION

There is a desire in the food industry to create visually attractive products to provide the best possible experience for the consumer. One way to enhance the product appearance is by applying attractive patterns onto the surface of the product, made from edible materials such as coatings, chocolate or other edible liquids.

The application of decorative patterns is widely used in the confectionery industry. One way to generate such patterns is by applying lines, waves or similar structures onto the product surface. A typical way of application is by dispensing a liquid onto the surface though a pipe containing multiple openings. This pipe is typically located above the products. The product passes beneath the pipe and the liquid generates lines on the surface. By oscillating the tube, a pattern of waves can be formed. This technology is used in confectionery industry for products such as pralines, cookies and many other applications.

While application of decorative lines onto edible products passing beneath the applicator is a common practice, there is no solution to apply parallel vertical lines onto vertical product surfaces in a process of horizontal pass-by in a satisfactory manner. However, a horizontal pass-by movement of products is a common feature on many industrial manufacturing processes.

DE2725181 concerns the application of decorative patterns from a dispenser located above the product. According to the movement performed, lines, waves, and zig-zag lines can be applied on the product below the applicator. The system cannot be used on vertical product surfaces.

WO2013/092503A1 discloses a technology to apply lines onto vertical surfaces of ice cream bars, such as extruded or molded sticks. The fluid is projected from nozzles against the surface of products which perform a down/up movement. The application of vertical lines on vertical product surfaces which travel by horizontally is not possible.

Application of chocolate lines onto a confectionery product can also be achieved by means of a spinning cup or wheel, equipped with one or more holes.

EP0048184 discloses a spinning wheel projecting chocolate lines straight up into inverted molds located above the spinning cup. There is no mentioning of using this technology on horizontal surfaces. (Application number is 81304291.8)

US2002/0068119 A1 describes a system for decoration of a vertical surface of confectionery products. The working principle consists of a cup filled with liquid chocolate or another liquid and spinning it around a vertical axis and passing by the products in a horizontal movement. Through holes in the cup, the decoration liquid is ejected outwards during the rotation and gets projected against a vertical surface that is within the reach of the projected material. Since the cup dispensing the liquid rotates around a vertical axis, the fluid projected against a vertical product generates horizontal or near horizontal lines. Vertical or near vertical lines cannot be generated by this technology.

WO 02/082918 concerns decoration of products that perform an up/down movement during application of the lines. In the process, chocolate lines are ejected from a cup rotating around a vertical axis and provide a generally crisscross pattern onto a moving vertical surface. An ice cream bar moves down/up in front of the ejected chocolate lines. So while the ejected chocolate travels horizontally, the product travels down—this generates a diagonal line of chocolate on the product surface. When the product moves up, there is again a diagonal line painted on the product, but with a different orientation. Combined, both lines give a crossed line pattern. On page 6, line 6 ff, the patent mentions generation of generally vertical lines crossed by generally horizontal lines but does not teach generation of only vertical lines and does further not teach application onto horizontally moving products.

WO 2012/080360 discloses a wet-in-wet double coating. It describes a process of applying a pressurized stream of chocolate onto the previously coated surface of an ice cream bar by means of a syringe needle. While this technology can generate vertical lines, the patent does not teach about technical means to perform such lines in an industrial environment.

There is therefore a need to provide a dosing system that remedies the shortcomings of the existing solution and apply decorative lines onto the surface of vertically oriented products which exhibit vertical or near vertical orientations. Further, there is a need to provide such decorations to a high level of accuracy.

SUMMARY OF THE INVENTION

We surprisingly found a way to apply vertical and near vertical lines onto a substantially vertical surfaces in a simple way without the drawbacks known from existing technologies. This invention allows application of straight, unblurred, vertical lines made from a decoration fluid. It further allows the application of lines onto continuously moving products.

Accordingly, the present invention relates an apparatus for applying stripes of liquid coating on a confectionery product comprising
- a rotatable applicator for liquid coating,
- at least one shield positioned above the rotatable applicator to collect coating material not applied onto the product,
- a manifold for providing the rotatable applicator with the coating material in a liquid form, and wherein the rotatable applicator is arranged to spin about an axis which is orientated from horizontal and up to 30 deg of deviation from horizontal and wherein the applicator has openings along it's circumference through which coating material may be projected upon spinning of the applicator.

It is preferred that at least one shield is arranged in a position relative to the rotatable applicator which is such that the portion of the liquid coating projected from the applicator and not meant to hit the product is captured and drained away, without dropping onto the rotatable applicator nor onto the stream of liquid intended to hit the product.

In a second aspect, the invention relates to a method for preparing a confectionery product with stripes comprising supplying a liquid coating material to a rotatable applicator disclosed herein;
providing confectionery products,
spinning the rotatable applicator to project stripes of coating material onto the product,
shielding with a least one shield the stripes of liquid coating projected upwards and in the direction of the product which do not hit the product, the shielding being done before the stripes of coating material are broken into droplets of coating material.

In a further aspect, the invention relates to a confectionery product comprising stripes of coating material which has a width between 0.5 mm and 8 mm and which stripes are spaced at a distance between 1 mm and 30 mm.

BRIEF DESCRIPTION OF THE FIGURE

In FIG. 2b 1: The rotatable applicator cup (1) comprises fluid feeding hole (2). The sense of rotation is indicated with reference (5) and the rotatable applicator axis is (9). A shield (7) is shown above the applicator (1). Fluid ejection holes or openings (8) are present in the applicator.

DETAILED DESCRIPTION OF THE INVENTION

Figure 1:
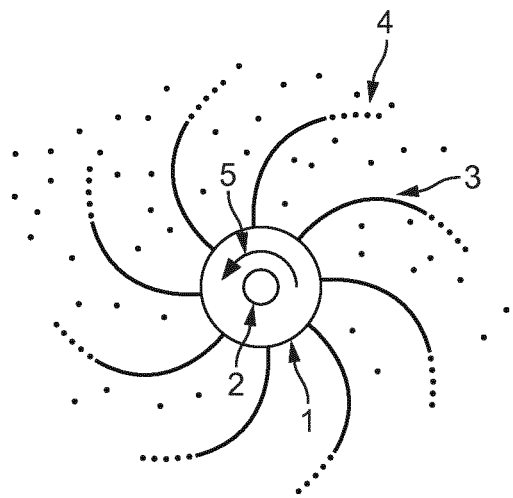
FIG. 1 schematically illustrates ejection of spiral-shaped streams of liquid coating into airspace in all directions within the plane of rotation from a rotatable applicator having a cup shape. The liquid stream breaks up into droplets in a certain distance from the cup, creating a shower of undesirable droplets.

In the present context a "rotatable applicator" means an object capable of rotating around a horizontal axis with deviations of up to 30 deg from horizontal, while providing a continuous stream of liquid coating material. The rotatable applicator can be a cup, one or more pipes or nozzles, or a combination thereof. In a preferred embodiment the deviation from horizontal is up to 20 degree. In another preferred embodiment the applicator has a horizontal axis. The rotatable applicator can spin at a rate of between about 100 rpm to about 2500 rpm. Preferably the rpm is in the range between 500 to 1500 rpm which can provide a projected stream onto a vertical surface which is located within a distance between 20mm and 500 mm from the applicator. The outlet openings of the cup can be arranged in one or more rows, be of various diameters or may form a straight or curved line along the circumference.

By shield is meant a device for collecting excess coating material. In particular, the shield collects such coating material that would otherwise result in additional and unwanted deposition of coating material on the product surface, thereby substantially overlaying and destroying the desired pattern. A shield can be a plate, oriented above the rotatable applicator or a plate equipped with one or more flaps to allow higher streams of fluid to be handled. In this embodiment of the invention the shield is preferably a plate and comprises a series of 1 or more flaps oriented with an angle of 20 to 90 deg as measured from the surface of the plate.

The shield can further be a set of flaps which are able to capture and drain away higher volumes of decoration fluid. The shields can be made of stainless steel or other metals or of plastic.

By coating material is meant a liquid to be applied onto the product surface which can be a fat based material, such as a chocolate or a compound coating. A preferred coating material is chocolate coating, as exemplified in Goff, Hartel: Ice Cream, Seventh Edition, page 276, f. A preferred viscosity of the coating material is between 100 cP and 2000 cP, more preferably between 200 and 400 cP. Coating material can also consist of water based liquids such as juices, jelly material in its liquid state, dairy based liquids such as a liquid mix of ice cream, sorbet, sherbet and similar liquids.

In conventional industrial production of frozen confections, such as extruded ice cream bars, products are typically produced at a rate of about hundred to several hundred pieces per minute, as laid out in Goff, Hartel: Ice Cream, Seventh Edition, page 279. The ice cream bars are typically handled with the product oriented vertically, i.e. suspended side by side by the stick using grippers and are moved via a conveyor system. According to the present invention, this product position is preferably used to apply the decorative lines, whereby the products and the apparatus move relative to each other horizontally, by passing either the confectionery products by the applicator along a horizontal path or passing the applicator along the products. It is preferred that this movement is continuous.

Ice cream bars can be coated by dipping them into a liquid coating material or remain uncoated. Both coated and uncoated products are suitable for application of decorative lines according to the invention.

This dipping can be either performed by a down/up movement into the coating fluid. Alternatively, products travelling continuously along a production chain, can be lifted into a horizontal position (perpendicular to the direction of travel), then lowered to a vertical position into a chocolate dipping tank and again briefly raised to horizontal to exit the dipping tank. All this is done with the product continuously travelling forward.

Application of vertical or largely vertical lines onto vertical surfaces, according to the present invention, is achieved through dispersion of the coating liquid through a rotatable applicator spinning around a horizontal axis. The rotatable cup is equipped with a series of openings around the circumference. It is continuously fed with a stream of decoration fluid. While spinning, the liquid coating is ejected through the openings by the centrifugal forces generated. The flow pattern generated in the airspace from the liquid coating resembles spiral-like streams of fluid directed in all directions and away from the rotatable cup but within the plane described by the rotational movement—as shown in FIG. 1. It has been found that the fluids are ejected tangentially from the spinning cup and then follow a ballistic path. In FIG. 1 the rotatable applicator (1) has fluid feeding hole (2) through which ejected fluid lines (3) are generated. Droplets (4) from disintegrated fluid lines are created. The sense of rotation is shown with reference (5).

It is a typical property of fluids to exhibit surface tension at its interface to air. This has been found to lead to specific phenomena which effects the performance of said streams of liquid coating ejected into the airspace. While floating away from the cup and into the airspace, the streams of liquid coating become extended, leading to a thinning of the streams. At a certain point, the streams begin to break up into shorter strands and into individual droplets. This effect is illustrated in FIG. 1. While before this point, the decoration pattern consists of lines, once breakup started, the pattern resembles irregular strands and droplets. To achieve intact lines as decoration pattern on a product surface, the product has to be presented within a distance from the surface of the rotatable applicator that holds intact lines.

The streams of liquid coating ejected from the rotatable applicator will spread into all directions within the plane defined by the holes. However, only the fluid directed towards the vertical product surface is useful for creating a decorative pattern and need to reach the product undisturbed. Fluid streams floating in other directions are not useful for that purpose and may interfere with that stream, such as fluid projected upwards and falling back onto the product or onto the fluid stream floating towards the product. Those unwanted streams of fluid need to be handled in a way as to not deteriorate the desired decoration pattern. In contrast, fluid floating downwards and backwards, i.e. opposite to the side where the product is located, do not interfere with the creation of a desired pattern. That fluid can be collected and drained away, e.g. by means of simple vertical plates and a collection tray. However, streams projected upwards and "forwards", i.e. in the general direction of the product, are more difficult to handle. In particular, streams of liquid coating moving upwards need to be considered, since this material will fall back down onto the rotatable applicator, getting dispersed and creating a shower of droplets. As a consequence, decoration fluids ejected from horizontally spinning cups, which would negatively affect the desired decoration pattern, needs to be contained effectively. The present invention provides a solution to this problem.

Apart from preventing decoration fluid, which is ejected upwards, from falling back onto the rotatable applicator or the product surface, there is another critical point in achieving the desired decoration pattern. This relates to the rim or edge of the shielding device that separates fluid streams caught by the shield and being projected against the product surface. This problem is neglectible at low volume streams of liquid but aggravates with increasing amounts of fluid such as those volumes required in an industrial production environment. With higher amounts of fluid hitting the shield, the fluid can no longer flow downwards along the plate entirely, but parts of the fluid get pushed towards the edge of the shield. At the edge, said fluid accumulates and gets dragged away by the liquid stream from the rotatable applicator. Those portions of the fluid are projected onto the product creating unwanted patterns such as splashes.

According to the invention, shield members are used with a specific design and special orientation with regard to the rotatable applicator and the product to capture and remove unwanted portions of the liquid streams in order to have only desired portions of fluid reaching the product.

We surprisingly found a series of effective measures to capture and remove fluid not intended to hit the product. As a result, a clean design of attractive looking lines can be created on the product surface. The preferred application of the different measures depends on the amount of fluid that needs to be handled.

In a first preferred embodiment the at least one shield is arranged in the space above the rotatable applicator in a distance to the applicator which is such that the liquid coating ejected from the applicator in the direction of the product is not yet broken into droplets of coating material when it hits the shield.

Advantageously, the shield according to the invention is positioned above the rotatable applicator is a plate oriented at an angle of 40 to 80 deg as measured from the axis of the rotatable applicator and at an angle of 0 to 60 deg as measured from a horizontal line extending perpendicular to the axis of the rotatable applicator into the direction where the product is located.

This shield is applicable for lower amounts of fluid streaming from the rotatable applicator. The shield consists of a plate and is applied above the rotatable applicator in a way to be hit by the stream of liquid and is oriented at an angle of 40° to 80 deg as measured from the axis of the rotatable applicator. This arrangement allows fluid hitting the plate to flow downwards along the surface of the plate and away from the rotatable applicator. The fluid then drips down from the plate on one side of the rotatable applicator. Parts of the liquid dripping down from the plate may hit the axis of the rotatable applicator, however, there is no dispersion of the fluid from the axis due to the small diameter and consequently low centrifugal forces created.

The other critical area, as previously mentioned, is the rim of the cover separating fluid caught by the plate and fluid floating towards the product surface. While a simple plate as depicted in FIG. **2*b*** is able to handle a low volume stream of decoration fluid without generating unwanted splashes from the rim, higher volume streams require more effective handling of the fluid portion at the rim. To coat the vertical surface of a product, the stream of fluid must be directed sideways from the rotatable applicator and fluid floating upwards needs to be captured by a shield as described previously. Depending on the volume of fluid projected against the shield, at the rim of the plate, facing the product, some fluid drops may not flow down along the plate but may get dragged off the rim by the fluid stream and projected against the product as unwanted splashes. While the flow of fluid is still low, these unwanted droplets can be avoided by an additional angled orientation of the plate. To this end, the plate is oriented at an angle of 0 deg to 60 deg as measured from a horizontal line extending perpendicular to the axis of the rotatable applicator into the direction where the product is located. This orientation forces fluid to flowing away from the edge of the plate, thereby preventing droplets being dragged away and projected against the product surface.

Figure 3:
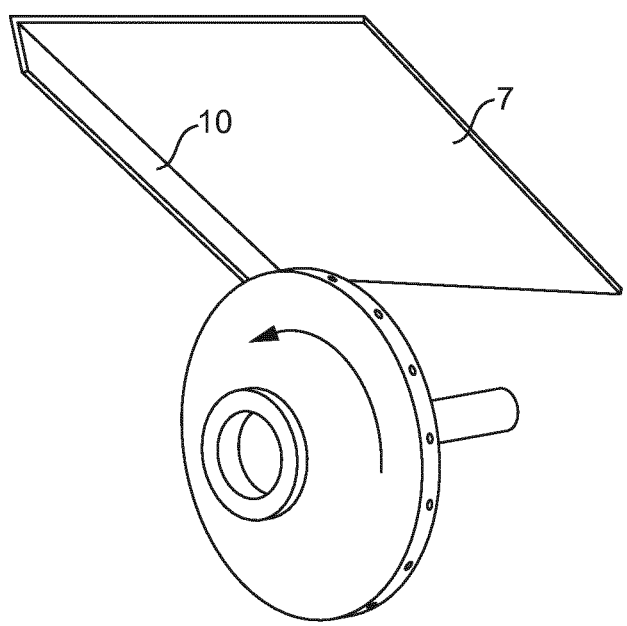
FIG. 3 is a schematic illustration of a shield equipped with a flap capable of handling medium volume stream of decoration fluid. The flap eliminates splashes of fluid resulting from fluid being pushed to the edge of the plate.

In a second preferred embodiment of the invention, a member is added to the plate described in the first preferred embodiment. This is useful for fluid volume streams higher than mentioned in the first embodiment. At such levels of flow, the measures mentioned in the first preferred embodiment would no longer be sufficient in preventing splashes of fluid on the product surface. The added member consists of a flap added to the edge of the plate at an angle of 20 to 90 deg, preferably approximately 45 deg with regard to the surface of the plate. This is depicted in FIG. 3 where the shield plate (7) with a flap 10 added on the plate is shown.

The added flap solves the problem of splashes from fluid accumulation at the edge at medium levels of fluid volume. Firstly, it prevents fluid from being pushed towards the edge, thereby reducing the accumulation of fluid at the edge. Secondly, the remaining fluid accumulated at edge of the flap is pushed by the stream around the edge where it can flows down undisturbed without causing splashes. While this set-up can handle moderate volume streams of fluid, further increase of the volume will still overwhelm the system and again, splashing will occur.

In a third preferred embodiment of the invention, a series of 3 or more flaps is used and allows to handle large volume streams of fluid as required for example in the industrial manufacturing of extruded ice cream sticks.

The flaps according to the invention may be orientated parallel or not parallel.

Figure 4:
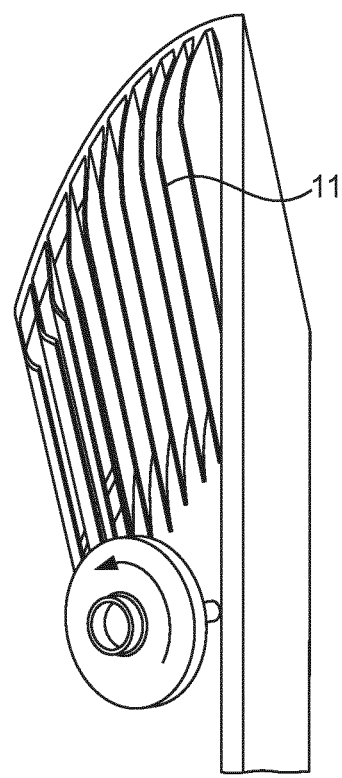
FIG. 4 is a perspective view of another embodiment of the invention, designed to handle higher volume flows of decoration fluid. The set of flaps effectively capture and drain away the fluid that is not intended to hit the product surface.
Figure 5:
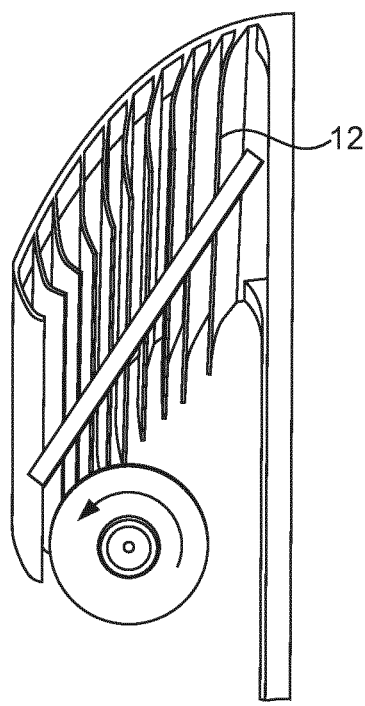
FIG. 5 illustrates the intersections between the fluid ejected from the rotatable applicator and the shield. The intersections are on a line which is inclined with regard to a horizontal plane.

FIG. 4 demonstrate such a set-up, characterized by a series of 3 or more flaps (11) each of which individually catches and drains off fluid projected against it. The flaps are located at a distance between each other between 4 mm and 40 mm, preferably between 6 and 12 mm. The performance is further enhanced by having the flaps bended wing-like as shown in FIG. 4 with the edge of each flap being individually aligned with the direction of the fluid stream hitting it. This way, a maximum of fluid is captured and drained off. FIG. 5 shows a line (12) indicating the impact area of the fluid stream on the flaps.

Figure 6A:
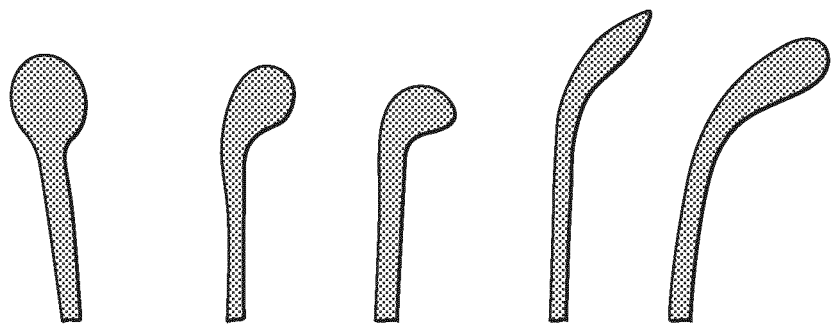
FIG. 6a depicts characteristic morphological featured of the tip of lines consisting of a fat based coating fluid as they appear on a product surface.

In this embodiment the flaps are preferably oriented at an angle of 40° to 80 deg as measured from the axis of the rotatable applicator to allow drainage of the caught fluid towards the side of the rotatable applicator. They are further oriented approximately vertical or leaning up to 60 deg in the direction where the product is located, as measured against a vertical line. whereby the flaps can be parallel or of individually varying angles. The capacity of capturing and draining off fluid may be further enhanced by orienting the flaps in a way to have the points of intersection of the fluid intersecting with the individual flaps along an approximate straight line at an angle between 20 deg to 70 deg (FIG. 6) as measured to a horizontal line.

In a preferred embodiment of the invention the applicator is provided with openings that are orientated in one or several rows around the circumference of the rotatable applicator, preferably in one row. The openings are preferably positioned with equal distance. The openings can also be two or more rows. The openings can further be arranged in a straight row or in a zig-zag arrangement. Further, the openings can be arranged at varying distances relative to each other and the size and shape of the openings can vary.

The rotatable applicator may be circular and with varying diameters and shapes, including, but not limited to, ellipsoid.

The apparatus and method according to the invention may be used for decorating all kinds of food product e.g. sweet or savory products. It has been found to be particular useful for confectionery products. Confectionery products can be at confectionery bars, frozen dessert, ice cream, baked product, praline, cake, fondant, water ice, sherbet, wafer cone, ice cream sandwich component, or cookie. The invention has been found to be particular useful for frozen confectionery products and products with a stick.

The method may also include applying a layer of at least one coating material such as chocolate onto the confectionery before or after the application of stripes by dipping or enrobing the confectionery with chocolate or by spraying chocolate onto the confectionery and wherein the chocolate is one of milk chocolate, dark chocolate, white chocolate, or combinations thereof, and optionally where the chocolate is partially substituted with a fat other than cocoa fat component. Each foundation layer of chocolate has a thickness between about 0.1 mm to about 2 mm, preferably between about 0.25 mm to about 1.5 mm, and more preferably between about 0.5 mm to about 1 mm. The coating applied before or after the stripes can be a full or partial coating of the product.

In a preferred embodiment of the invention the liquid coating material is fat or water based material. The fat based material can be chocolate. Chocolate may be ordinary chocolate according to accepted regulations or it may be a fat containing confectionery compound material containing sugar, milk derived components, and fat and solids from vegetable or cocoa sources in differing proportions having a moisture content less than about 10 percent, preferably less than about 5 percent by weight. The fat-containing material may be a chocolate substitute containing direct cocoa butter replacements, stearines, coconut oil, palm oil, butter, or any mixture thereof, nut pastes such as peanut butter and fat; praline; confectioner's coatings used for covering cakes usually comprising chocolate analogues with cocoa butter replaced by a non-tempering fat; or a mixture of non-cocoa butter fats, sugar, and milk.

The space between the lines on the product may be adapted by adjusting the speed by which the product is advanced along the horizontal path. It may be further adjusted by the number of openings along the circumference of the rotatable applicator and by the speed of rotation of the latter.

The number of lines ejected from the apparatus towards a product surface can be determined as follows:
LPS: Lines ejected from the apparatus per second
U: Revolutions of the rotatable applicator per minute (rpm)
H: Number of ejection holes in the rotatable applicator $$LPS = \frac{U}{60} \times H$$

E.g. for an applicator having 16 holes and turning at 1000 rpm, there are 267 lines ejected from the apparatus per second.

The number of lines applied onto a 10 mm wide product surface can be calculated from the above formula and the velocity of the product relative to the apparatus as follows:
LD10: Line density (number of lines) per 10 mm of horizontal product surface
VProduct: Speed of the product in m/s LPS: Lines ejected from the apparatus per second $$LD10 = \frac{LPS}{VProduct \times 100}$$

E.g. for a LPS of 267, applied onto products moving past the apparatus at a speed of 1 m/s, there will be 2.7 lines applied onto each cm of the product. A product being 5 cm wide will then receive 13 lines. Center-to-center distance between the lines will be 3.7 mm.

When applying a high density of lines of liquid coating material, the lines may even touch, creating a continuous surface coverage.

As accordance with the above-discussion, the present invention also relates to a confectionery product comprising stripes of coating material which has a width between 0.5 mm and 8 mm and which stripes are spaced at a distance between 1 mm and 30 mm. Furthermore, the invention relates to a confection on a stick manufactured on an industrial production line having straight and parallel lines orientated parallel to the longitudinal axis of the stick or with a deviation from that axis of 30 deg towards both sides. This product is preferably a frozen confection.

Lines of liquid coating material may either be applied by a rotatable applicator turning clock-wise or counterclockwise about its axis. In both cases, shielding is required to catch and drain off unused portions of the fluid stream but the location of the shields will vary.

Figure 6B:
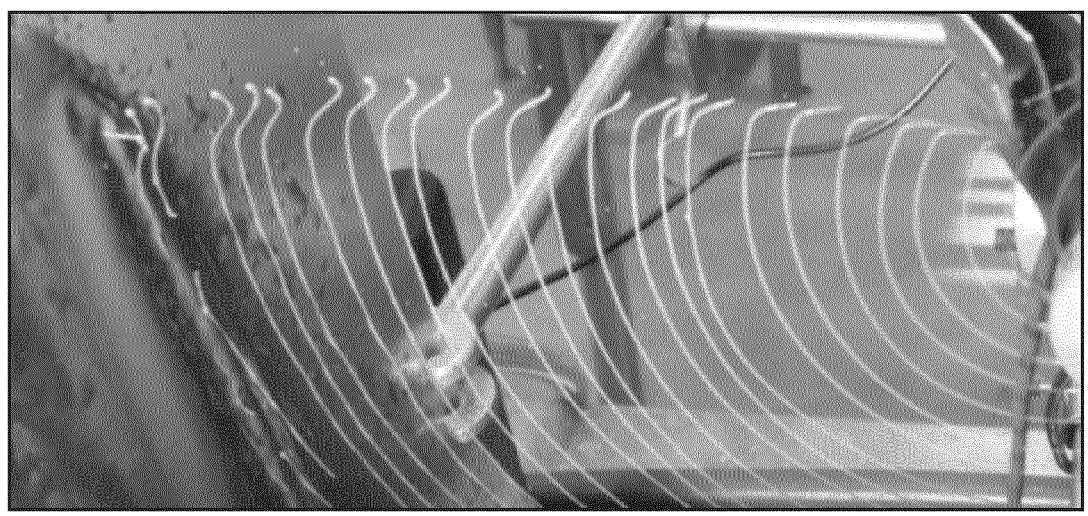
FIG. 6b is a photo demonstrating the change of shape on the tip of lines generated from a fat based coating. The tip of the lines, ejected from the applicator on the right, travel to the plate on the left where they impact.
Figure 7:
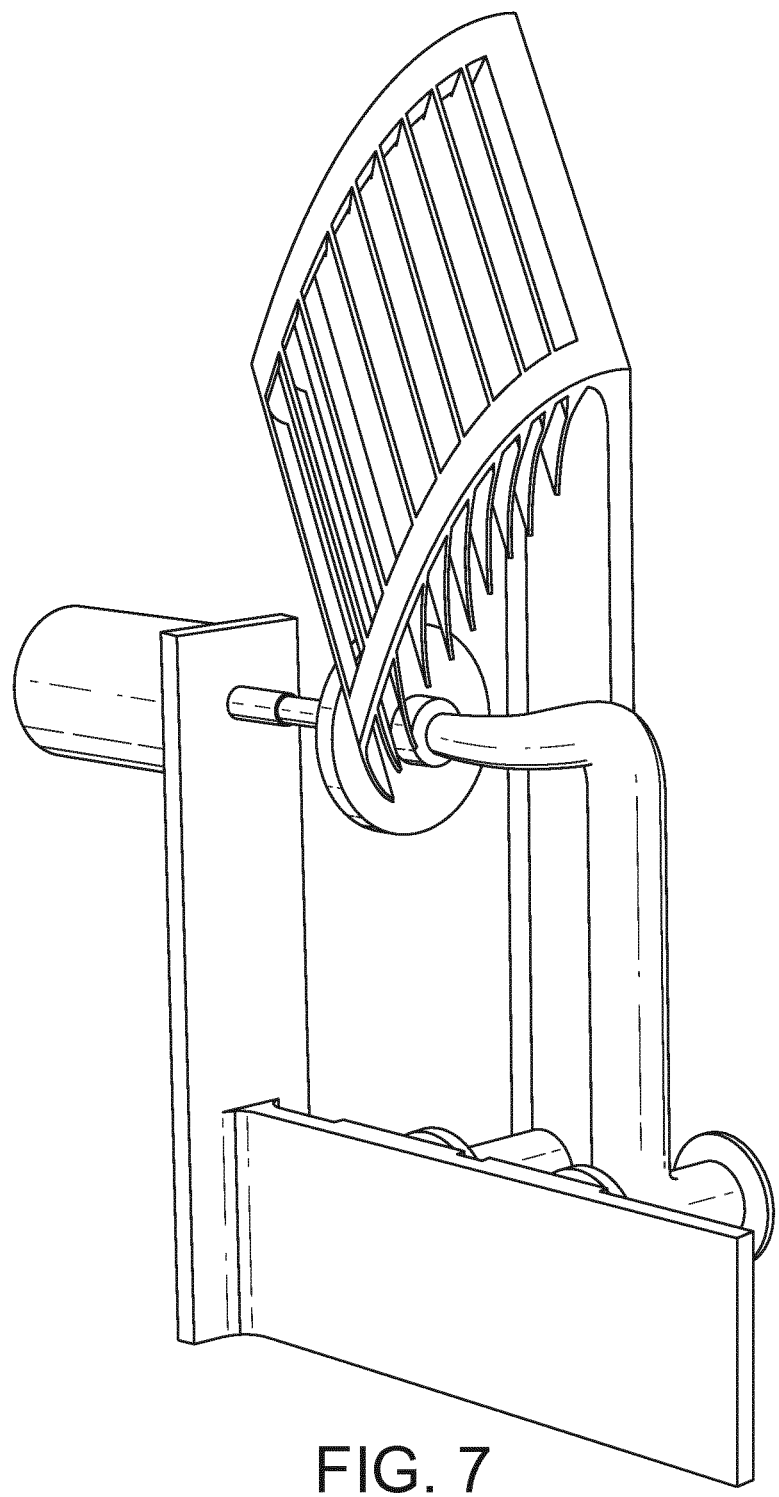
FIG. 7 shows an apparatus according to the invention.
Figure 8A:
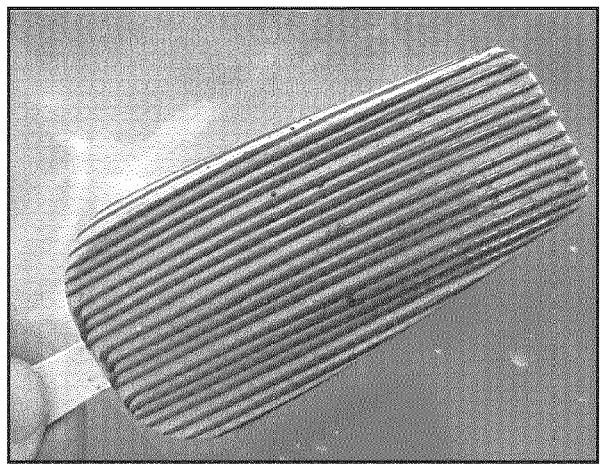
FIG. 8a to c show products with applied lines according to the invention.
Figure 8B:
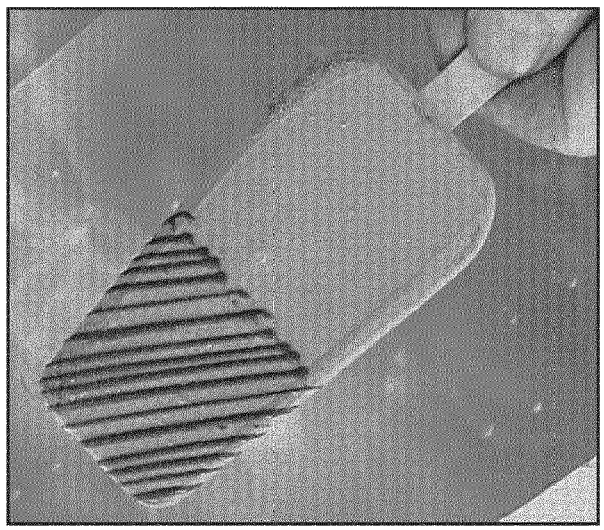
Figure 8C:
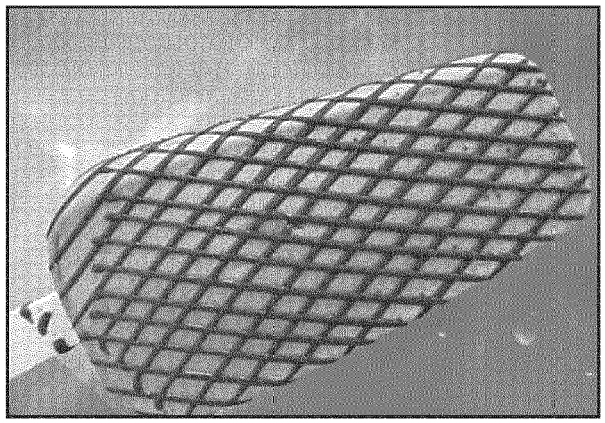

Fluid lines projected onto vertical surfaces with the apparatus have morphological characteristics related to the generation of such lines. For a line that is generated in a way such that the starting point of the line becomes visible on the surface the characteristic feature is located at the tip of the line, i.e. at the point where the beginning of the line hits the surface. When a line ends on the product surface, the same characteristic feature can be seen at the end point of the line. At this point, a thickening of the line or a deviation from the axis of the line is observed. The thickening can be a dot at the tip of the line or a short stretch of the line that is thicker than the rest of the line. The dot or short stretch can be in the axis of the line or leaning to the left or right of the line. A short stretch of the line at the tip can also deviate from the axis of the line without thickening. A depiction of some typical shapes of such features is on FIG. 6a. FIG. 6b is a picture showing the change of the shape of the projected lines of coating material.

These features cannot be observed on lines on the product surface which are applied such that during application they start or end outside of the product surface. The morphological feature forms at the rim of the shield when the line of fluid is separated into a part that continues floating towards the product surface and a part that is held back by the rim of the shield. At this point, the line gets extended into a thin strand that finally breaks. This thin strand of fluid, due to interfacial forces, starts retracting back towards the line of fluid, thereby finally forming a droplet at the end of the line. This is shown in FIG. 6b, illustrating various states of this process on successive lines of a chocolate coating. As the fluid line hits the product surface, this structure is transferred onto the product. Depending on the moment when the fluid line hits the surface, variants of these structures are projected and become visible on the surface.

The invention also relates to a confection discussed above and comprising decorative lines applied onto vertical surfaces which have a thickening in the form of a dot or a short stretch of line located in the axis of the line or leaning to one side and being situated either at the beginning or the end of a line being, which dots or short stretch lines are results from the start or end of coating material supply to the lines.

In one embodiment of the apparatus two rotatable applicators are mounted on opposite sides of a production line facing front and rear faces of the confectionery. A product passing by such a set-up would then be equipped with decorative lines on both sides simultaneously. Each one of the two devices would need its own shield as described for a single applicator. Two devices placed in a row and facing the same side of a product can be used to apply crossed lines if the devices are mounted at different angles in a way that the lines cross.

EXAMPLES

By way of example and not limitation, the following examples are illustrative of various embodiments of the present disclosure.

Example 1

A rotatable applicator is prepared with an outer diameter of 80 mm and 4 holes of a diameter of 3.0 mm in equal distance along a line around the circumference of the applicator. The applicator is turning around its horizontal axis at 400 rpm. Chocolate coating of a viscosity of 250 cP and a temperature of 40 deg C. is provided into the applicator at a rate of 1 litre per minute which allows to maintain a pool of fluid inside and not let air enter the exit holes.

Figure 2A:
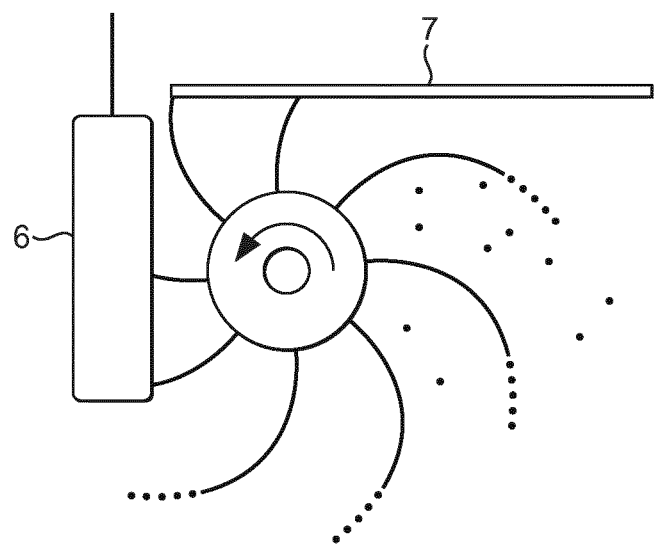
FIG. 2a schematically illustrates the equipment set-up for projecting of streams of liquid coating against a vertical product surface. A shield (7) (shown in cross-section) positioned above the rotatable applicator captures unwanted streams of decoration fluid, thereby creating a zone where pure coating lines, without droplets, are available for decoration effects. The product (6) is located in that zone.
Figure 2B:
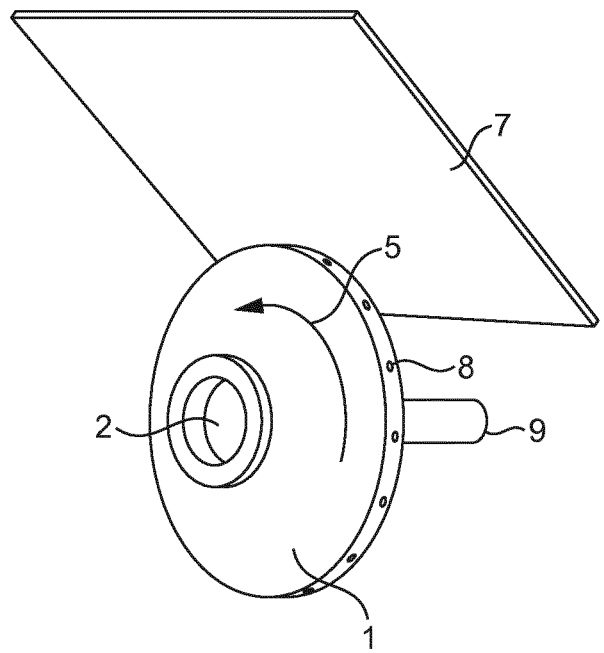
FIG. 2b illustrates in perspective view the inclined orientation of the shield (7) above the rotatable applicator. The inclination allows coating material projected upwards against the shield to flow down along and drop off the shield without dripping onto the rotatable applicator or the product (6).

A plate was fixed over the applicator according to FIG. 2, with the edge facing the product reaching 20 mm beyond the front of the applicator. The intersection of the fluid steam and the plate is located 20 mm above the upper edge of the applicator. During operation, this arrangement projects 27 lines per second onto a product which passes by parallel to the axis of the rotatable applicator. The apparatus provides lines without splashes and additional droplets.

Example 2

By increasing the number of holes along the circumference to 8 holes of 3.0 mm diameter and increasing the amount of fluid supplied to 2.6 liter/min, the number of lines generated at 500 rpm rises to 67 per second. The fluid used was the same as in Example 1. However, there is a considerable generation of drops and splashes being projected against the product. When adding a flap of a width of 20 mm at the edge of the plate facing the product at an angle of 40 deg as measured from the plate, the splashing stops.

Example 3

In this example there is an increase of the rpm of the rotatable applicator to 800 rpm. The rotatable applicator has 8 holes of 3.0 mm diameter and is providing fluid at a flow rate of 3.9 litre/min, the apparatus as described in the second example will generate a considerable amount of splashes and droplets. This can be remedied by replacing the plate and flap by an assembly of 10 flaps arranged as laid out previously. The apparatus is now generating 107 lines per second without splashes and droplets.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An apparatus for applying stripes of liquid coating on a confectionery product comprising:
   a rotatable applicator for the liquid coating;
   at least one shield positioned above the rotatable applicator to collect the liquid coating not applied onto the confectionary product;
   a manifold for providing the rotatable applicator with the liquid coating;
   the rotatable applicator is arranged to spin about a spin axis which is orientated between 0 to 30 degrees of from a horizontal plane, and wherein the rotatable applicator has openings along a circumference of the rotatable applicator through which the liquid coating may be projected upon spinning of the rotatable applicator; and
   wherein the at least one shield positioned above the rotatable applicator comprises a plate oriented at an angle of 40 to 80 degrees as measured from the spin axis of the rotatable applicator and at an angle of 0 to 60 degrees as measured from a horizontal line extending perpendicular to the spin axis of the rotatable applicator into the direction where the confectionary product is located.

2. The apparatus according to claim 1, wherein the plate comprises one or more flaps oriented with an angle of 20 to 90 degrees as measured from a surface of the plate.

3. The apparatus according to claim 1, wherein the at least one shield comprises a series of three or more flaps wherein the flaps are oriented vertical or leaning up to 60 degrees in the direction where the confectionary product is located, as measured against a vertical line.

4. The apparatus according to claim 2, wherein the one or more flaps are oriented parallel to one another.

5. The apparatus according to claim 1, wherein the rotatable applicator is arranged to turn clockwise and/or counter-clockwise at the spin axis.

6. The apparatus according to claim 1, wherein the openings are orientated in one or more rows around the circumference of the rotatable applicator.

7. The apparatus according to claim 1, wherein the openings are oriented in a straight line or in a line that has a curved or zig-zag shape, and/or a distance between the openings is equal or of varying distance to each other.

8. The apparatus according to claim 1, wherein the openings are of varying diameter and shapes from each other.

9. The apparatus according to claim 1, wherein the rotatable applicator is capable of rotating at a speed of between 100 and 2500 rpm to project the liquid coating.

10. The apparatus according to claim 1, wherein the plate comprises one or more flaps, wherein the one or more flaps are bent with each edge of the one or more flaps aligned with a direction of the liquid coating projected onto the one or more flaps.

* * * * *